United States Patent [19]

Lipscomb

[11] Patent Number: 4,509,891

[45] Date of Patent: Apr. 9, 1985

[54] METHOD AND APPARATUS FOR SUPPLYING METAL COILS TO A PROCESSING STATION

[75] Inventor: Robert J. Lipscomb, West Chicago, Ill.

[73] Assignee: Precision Steel Warehouse, Inc., Franklin Park, Ill.

[21] Appl. No.: 51,217

[22] Filed: Jun. 22, 1979

[51] Int. Cl.³ .................................................. B65G 59/04
[52] U.S. Cl. ......................................... 414/113; 414/28; 414/121; 414/911; 198/345; 198/486; 294/97; 294/64.1
[58] Field of Search ................................. 414/120–122, 414/684, 911, 113, 28; 242/79; 100/7, 12; 198/341, 466, 467, 486, 522, 345; 294/2, 64 R, 97, 93

[56] References Cited

U.S. PATENT DOCUMENTS

| | | | |
|---|---|---|---|
| 2,767,932 | 10/1956 | Valin | 414/684 |
| 3,251,623 | 5/1966 | Fredholm | 294/97 |
| 3,294,012 | 12/1966 | Kobiella | 198/341 |
| 3,336,860 | 8/1967 | Sawyer et al. | 100/7 |
| 3,758,144 | 9/1973 | Dalglish | 294/97 |
| 3,960,260 | 6/1976 | Azuma et al. | 198/345 |
| 4,108,933 | 8/1978 | Goransson et al. | 414/121 |
| 4,154,470 | 5/1979 | Dalglish | 294/93 |
| 4,175,676 | 11/1979 | Renaud et al. | 414/121 |

FOREIGN PATENT DOCUMENTS

1176816 8/1964 Fed. Rep. of Germany .... 294/64 R

Primary Examiner—Joseph E. Valenza
Attorney, Agent, or Firm—Gerlach & O'Brien

[57] ABSTRACT

Method and apparatus for supplying individually to a processing station, such as a banding station, metal coils which are provided in groups of adjacent side-by-side coils, the groups of coils being placed on a conveyor line in following order with the coils in each group stacked vertically, conveyed to a separating station in turn, and destacked by mechanically lifting from the top of each group, carrying forwardly, and depositing on the conveyor line at a depositing station individual coils of the group successively, while the group is stationary, and the deposited coils being conveyed forwardly towards the processing station. Following groups are accumulated on the conveyor line in advance of the separating station while a group of coils is stationary on the separating section for destacking thereof. A group of annular coils is oriented on a supporting conveyor section at the separating station prior to destacking, by inserting a stop member into the group through the openings in the coils and into abutting engagement with the rear portions of the inner wall surfaces of the coils, while driving the conveyor section.

11 Claims, 17 Drawing Figures

METHOD AND APPARATUS FOR SUPPLYING METAL COILS TO A PROCESSING STATION

BACKGROUND OF THE INVENTION

This invention relates to a method and apparatus for supplying metal coils to a processing station. More particularly, the invention relates to a method in which and to apparatus by means of which groups or stacks of coils are conveyed in following order to a destacking station, whereat each group is destacked by mechanical lifting means, more specifically, a lifting head, following which the coils are conveyed individually to the processing station.

Metal coils are produced by slitting sheet metal with a slitter as it is removed from a roll, and winding the metal strips from the slitter onto a cylindrical winding drum of a coil winder, rotating the drum about a horizontal axis. A group of annular coils is formed on the winding drum in this manner, in adjacent side-by-side relation to each other. There may be, for example, as many as 21 adjacent coils in the group. Orders are filled as the coils are produced, and for this purpose, the coils are supplied to a packaging line.

The packaging line includes one or more processing or operating stations, where packaging operations are performed, a conveyor line for supplying coils to the processing station or stations, and a mandrel for supplying coils to the conveyor line. The first processing station commonly is a banding station, at which bands are fastened around the coils to secure the loops or spiral windings of each coil together. The banded coils may be conveyed to a second station, at which they are palletized.

Each group of coils as produced is removed from the winding drum for supply to the packaging line by sliding onto an adjacent mandrel registering with the drum. The mandrel subsequently is moved into a position of registry with a then horizontally disposed movable spindle on a rotatable vertically disposed loading section of the packaging conveyor line.

The practice in the industry has been to manually separate on the mandrel and transfer to the spindle one coil at a time. The loading section of the conveyor line, bearing a single coil, is rotated through an angle of 90°, from the vertically disposed transfer position to a horizontally disposed conveying position, from whence the coil is conveyed individually on the conveyor line to a processing station. The process is repeated until all of the coils in the group have been placed on the conveyor line.

Employing the foregoing method, wherein the conveyor line is loaded with successive individual coils, considerable time and labor is required for the coil transfer operations, a relatively long conveyor line is required to accommodate the production of the slitter, and backups are frequent and result in excessive amounts of down time in the slitting operation. The provision of increased conveyor length or storage space on the conveyor line or in adjacent areas requires excessive plant space and/or additional storage and/or conveying facilities and apparatus.

SUMMARY OF THE INVENTION

Employing the method and apparatus of the invention, groups of coils, such as the groups transferred from a winding drum to a mandrel, are placed on a conveyor line at a loading station, with the coils stacked vertically in the groups. The groups are conveyed towards a processing station, which in the preferred embodiments of the invention is a banding station.

The transfer of a group of coils from a mandrel to a loading section of a conveyor line requires but a single transfer operation, in which the group is transferred as a unit, rather than one such operation for each coil. Each group of coils, which may include as many as 21 coils, as noted above, occupies the conveyor area of but a single coil, rather than a multiple of such area as in the prior practice. A number of groups of coils may be accumulated on the conveyor line, whereas previously, the coils of but a single group might have occupied all or more than all of the capacity of the conveyor line.

A destacking station is provided between the loading station and the processing station. Groups of coils in following or succeeding order are conveyed to the destacking station in turn, and each group is destacked as it is held stationary at the station. In the process of destacking a group, each individual coil as it becomes the top coil of the group is mechanically lifted, carried forwardly, and deposited on the conveyor line. The deposited coil is conveyed towards the processing station. Following or succeeding groups of coils may be accumulated on the conveyor line between the loading station and the destacking station, and each of the following groups is conveyed to the destacking station following removal therefrom of the last coil of the preceding group of coils.

In handling annular coils, a group of coils is oriented on a supporting conveyor section at the destacking station by inserting a stop member into the group through the openings in the coils and into abutting engagement with the rear portions of the inner wall surfaces of the coils, while driving the supporting conveyor section.

Apparatus for supplying individually to a processing station the metal coils which are provided in groups of coils includes a horizontal conveyor line including successive accumulating, separating, and depositing conveyor sections leading forwardly from a loading station towards a processing station, the conveyor line being adapted for conveying the coils thereon, in the groups of coils with the coils thereof stacked vertically from the loading station to the separating section, and individually from the depositing section to the processing station, power drive means actuatable for driving each of the conveyor sections independently of the others, a lifting head operatable to engage the top coil of a group of coils on the separating section for the purpose of lifting the coil off of the remainder of the group, and to deposit the coil therefrom, means for operating the lifting head, means for moving the lifting head up and down over the conveyor line, and means for moving the lifting head back and forth between the separating section and the depositing section, whereby the drive means for the accumulating and separating sections may be actuated to convey to the separating section in turn the groups of coils arranged in following order on the conveyor line with their coils stacked vertically, the lifting head may be operated and moved to engage on top of each group of coils while stationary on the separating section, lift from the top of the group, carry forwardly, and deposit on the depositing section individual coils of the group successively, thereby to effect destacking of the group, the drive means for the depositing section may be actuated to convey each deposited coil forwardly out of its deposited position before the next coil is deposited therein, and the drive means for the accumulating section may be actuated while a group of coils is stationary on the separating section for destacking thereof, to accumulate following groups of coils on the accumulating section.

Preferred additional apparatus for use with annular metal coils includes a stop member insertable into a group of coils on the separating section through the openings in the coils and into abutting engagement with the rear portions of the inner wall surfaces of the coils while the separating section is driven, thereby to orient the group beneath the lifting head, and means for moving the stop member into and out of the group of coils. Means preferably are provided for detecting the registration of the stop member with the openings in the coils of the group on the separating section.

The lifting head preferably engages a coil on top of a group of coils for lifting purposes by application of suction thereto. Control means are provided for preventing the lifting head moving means from moving the lifting head upwardly to a substantial extent in the event of an insufficient application of suction to a coil for lifting purposes.

BRIEF DESCRIPTION OF THE DRAWINGS

The attached drawings illustrate preferred embodiments of the method and apparatus of the invention, without limitation thereto. In the drawings, like elements are identified by like reference symbols in each of the views, and.

DESCRIPTION OF THE PREFERRED EMBODIMENTS

Figure 1:
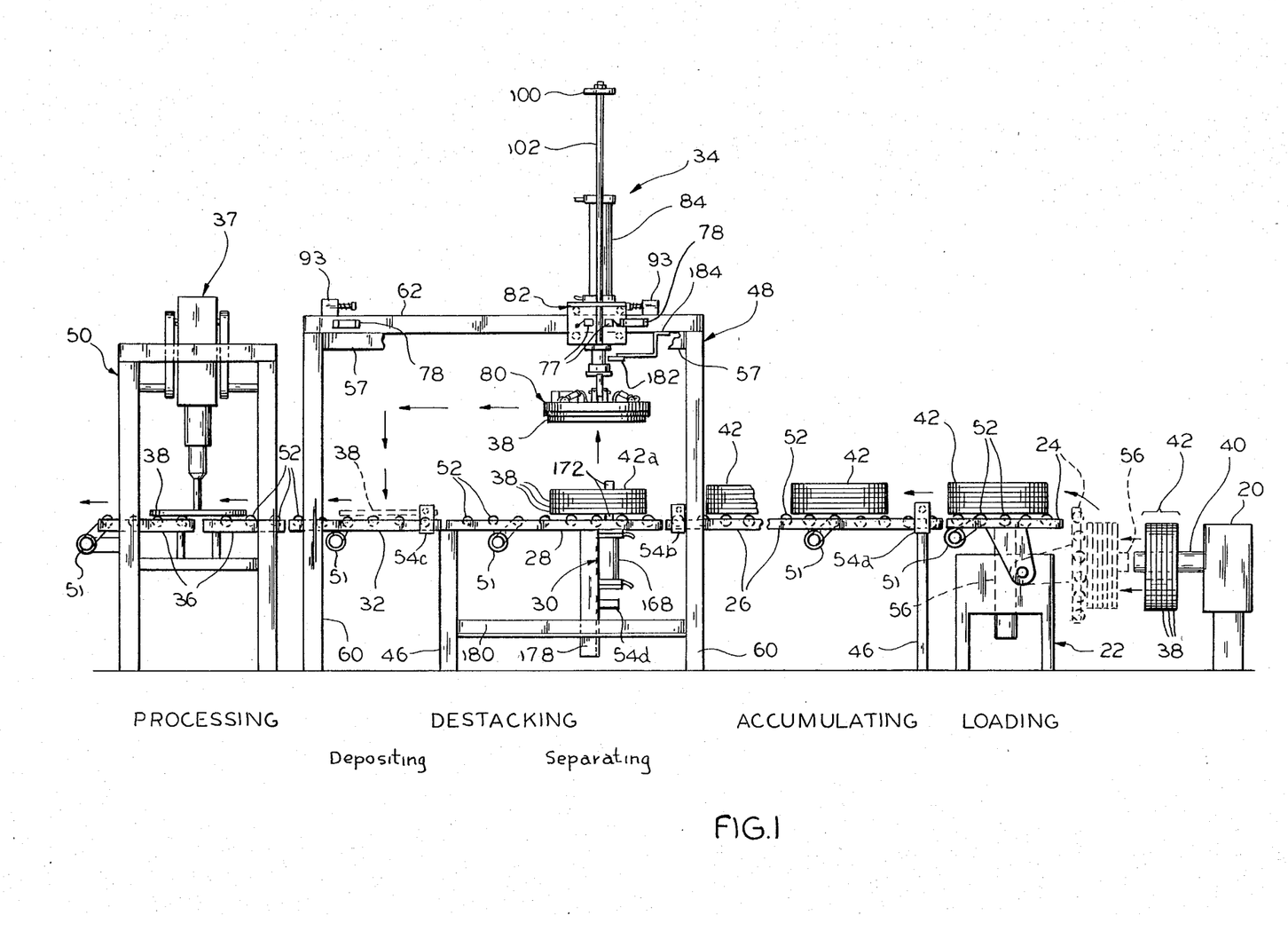
FIG. 1 is a generally schematic broken side elevational view of a packaging line including apparatus provided by the invention, the line extending from a coil-transfer mandrel unit illustrated to the right of the drawing, to a coil bander, illustrated to the left of the drawing, with legends provided to identify successive stations along the line.
Figure 2:
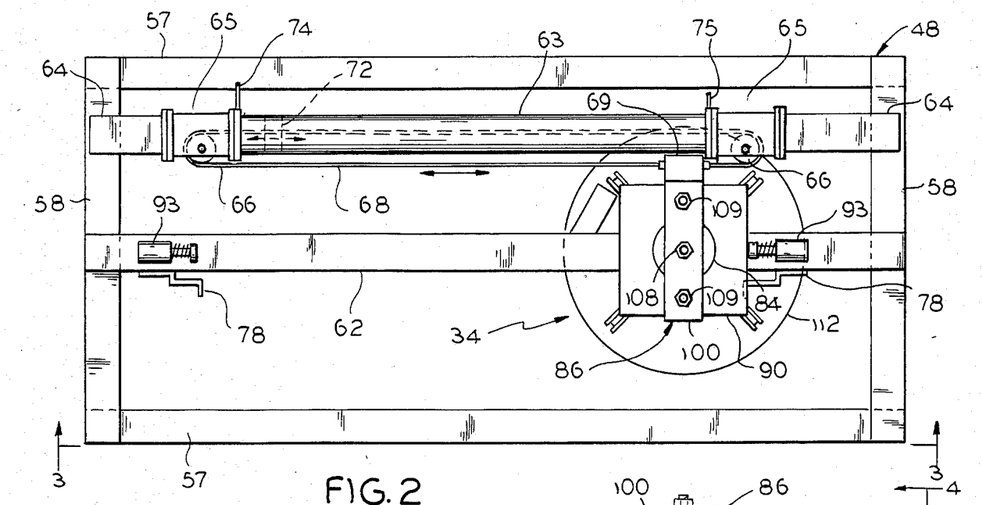
FIG. 2 is an enlarged top plan view of the structure at the top of apparatus at a destacking station.

Referring to FIG. 1, the apparatus illustrated includes, in succession from right to left, a mandrel unit 20, a "downender" unit 22 arranged at a loading station and bearing a loading conveyor section 24, an accumulating or storage conveyor section 26 situated at an accumulating station, a separating conveyor section 28 situated at a separating substation of a destacking station, a stop assembly 30 mounted beneath the separating section 28, a depositing conveyor section 32 situated at a depositing substation of the destacking station, a lifting head assembly 34 mounted above the separating and depositing sections 28 and 32, a split processing conveyor section 36 situated at a processing or banding station, and a bander or banding machine 37 associated with the processing station.

The mandrel unit 20 is mounted for cooperation with a coil winder, not illustrated, and with the loading section 24, swinging to and fro about a vertical axis in the process. As described hereinabove, a cylindrical winding drum of the winder is employed to collect therearound a group of adjacent or contiguous side-by-side annular coils 38, the products of slitting rolled sheet metal. The coils 38 each have a substantially circular central opening 39 (see FIGS. 7 and 8) defined by a corresponding inner wall surface 39a, on the inner "tail" of the coil. In one position of the unit 20, a mandrel proper 40 of the unit registers with the drum of the winder, for transfer of a group 42 of coils 38 from the drum to the mandrel 40, by sliding off of the former onto the latter. The mandrel unit 20 then may be rotated to the position illustrated in FIG. 1, where the coil group 42 is transferred to the loading section 24 at the initial loading station of the conveyor line, as described hereinafter.

The conveyor sections 24, 26, 28, 32, and 36 are mounted to form an extended straight horizontal conveyor line, the sections being arranged in tandem and essentially coplanar in the line. The conveyor sections are supported in any suitable manner, such as by stands having legs 46, and by respective destacking and processing station frames 48 and 50. Each of the conveyor sections 24, 26, 28, 32, and 36 is a power-driven roller conveyor, and may be driven independently of the others. The illustrative conveyor sections are conventional in their construction and drive, each being driven by electric motor-powered chain-and-sprocket drives or the like, as schematically represented at 51 in FIG. 1. In each case, the rollers 52 of the conveyor section are rotated so as to advance articles thereon from right to left or forwardly on the conveyor line as illustrated in FIG. 1.

Figure 4:
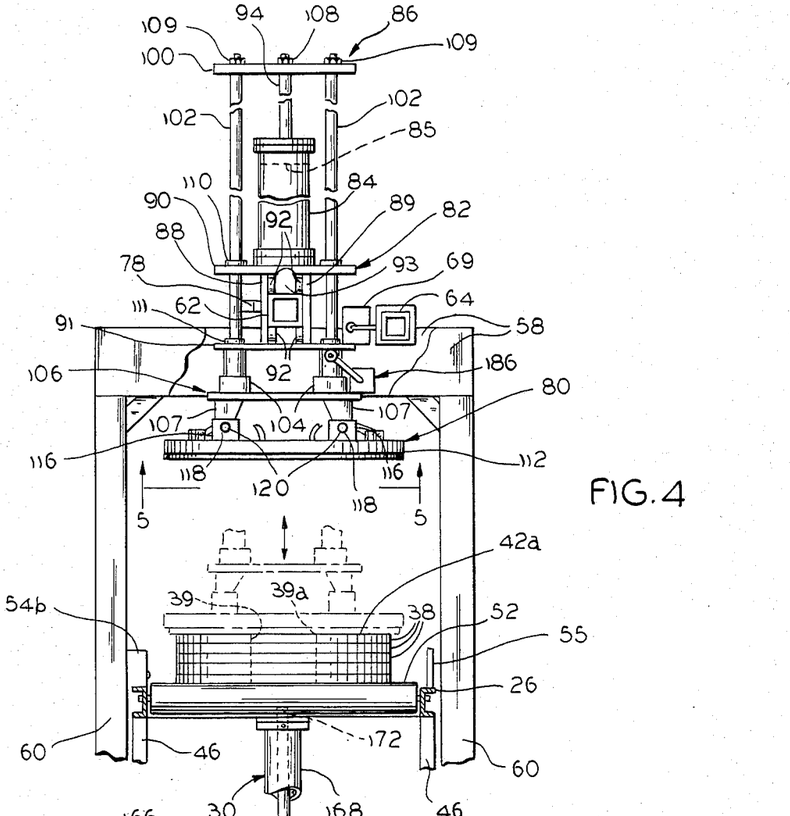
FIG. 4 is a similarly enlarged broken rear end elevational view of apparatus at such station, taken substantially on line 4—4 of FIG. 3.

First and second photocells 54a and 54b are mounted adjacent to the rear and front ends, respectively, of the accumulating section 26. A third photocell 54c is mounted adjacent to the rear end of the depositing section 32. The light beams of the photocells are directed transversely across the conveyor line and slightly above the rollers 52, and they impinge on reflectors on the opposite side of the line, as represented in FIG. 4 by the reflector 55.

The loading section 24 is mounted on the downender unit 22, for rotatable or pivotal movement thereon through an angle of 90 degrees. The loading section 24 rotates from a vertically disposed transfer position, illustrated in broken lines, to a horizontally disposed conveying position, illustrated in full lines. The loading section 24 cooperates with the mandrel unit 20 in the former position and with the accumulating section 26 in the latter position.

A spindle 56 is mounted on the loading section 24 to rotate therewith. The spindle 56 reciprocates between a position in which it projects normally to the face of the section 24 and a position in which it is withdrawn behind or beneath the section face. With the loading section 24 disposed vertically on the downender unit 22, and the spindle 56 projecting from the face of the section and in alignment or register with the mandrel 40, the coil group 42 is transferred by sliding it from the mandrel onto the spindle and against the loading section. The loading section 24 next is rotated to the horizontal position, where it forms a part of the conveyor line. The spindle 56 is withdrawn from the coil group 42, leaving the group seated thereon, as represented in full lines in FIG. 1, ready to be conveyed forwardly. At this time, the group 42 is disposed in the form of a vertical stack of coils 38.

The group 42 on the loading section 24 is conveyed to the accumulating section 26 by actuation of the conveyor drives 51 for the sections. After each group 42 has left the loading section 24, the mandrel unit 20 and the downender unit 22 may be operated to transfer an additional group 42 to the loading station. In the foregoing manner, a plurality of following groups 42 may be loaded on the accumulating section 26. The groups 42 are conveyed forwardly to the separating section 28 in turn, by actuation of the drives 51 for the accumulating and separating sections 26 and 28.

Referring to FIGS. 1-4, the destacking station frame 48 straddles the conveyor line, and it substantially encompasses the separating section 28 and the depositing section 32. The destacking station frame 48 has a rectangular top structure, constructed of a pair of spaced parallel horizontal longitudinal beams 57 and a pair of spaced parallel horizontal crossbeams 58 secured to the longitudinal beams at the opposite ends thereof. The top structure is supported by legs 60 secured thereto at the four corners thereof. A horizontal rail or track 62 extends longitudinally and substantially centrally between the longitudinal beams 57 in parallel thereto, and it is secured on top of the crossbeams 58 at its ends.

A pneumatic traversing cylinder 63 is mounted to extend horizonally between one of the longitudinal beams 57 and the rail 62 in parallel thereto. The cylinder 63 is supported on the crossbeams 58 by means of longitudinally extending support bars 64 secured to pulley mounts 65 on opposite ends of the cylinder. Pulleys 66 are rotatable on the mounts 65, and an endless cable 68 is trained thereon. The cable 68 is secured to a connector 69 on the lifting head assembly 34, extends therefrom along the outside of the cylinder 63, and extends through the cylinder 63. The cable 68 is secured to a piston 72 reciprocatable together with the cable in the cylinder 63. Air conduits 74 and 75 are connected to air ports at respective front and rear ends of the cylinder. Each of the ports serves alternately as an air inlet port and as an air exhaust port, for operation of the piston 72 in opposite directions.

Referring to FIGS. 1-7, the lifting head assembly 34 is mounted on the rail 62 for longitudinal reciprocal movement thereon, between the separating substation and the depositing substation. The lifting head assembly 34 includes as its major components a circular lifting head 80, a wheeled traversing carriage or trolley 82, a pneumatic lifting cylinder 84 having a piston 85 (FIG. 4) therein, and a connecting rod assembly 86. The lifting head 80, in general, is a conventional structure, designed for use in lifting and transporting annular metal coils.

The carriage 82 is constructed of a pair of spaced parallel longitudinally extending vertical side plates 88 and 89, which are secured to spaced parallel horizontal top and bottom plates 90 and 91, respectively. As illustrated in FIG. 4, the side plates 88 and 89 are spaced apart a distance slightly greater than the width of the rail 62, which is received therebetween. Upper and lower pairs of wheels or rollers 92 are mounted on the insides of the side plates 88 and 89 for rotation thereon. Two spaced apart upper wheels 92 on each of the side plates are disposed adjacent to the upper surfaces of the rail 62, and two spaced apart lower wheels 92 are disposed adjacent to the lower surface of the rail 62, for rolling engagement therewith, thereby providing for low friction travel of the carriage 82 back and forth on the rail. The cable connector 69 is secured to the bottom plate 91.

The travel of the assembly 34 is under the control of two horizontal travel limit switches 77 (FIG. 3), which are mounted on one side plate 88. The limit switches 77 engage respective brackets 78 or the like mounted on the rail 62 adjacent to and spaced inwardly from the crossbeams 58 at the opposite ends of the rail. Two hydraulic shock absorbers 93 are mounted on the rail 62 adjacent to the brackets 78. The shock absorbers 93 abuttingly engage the respective opposite ends of the top plate 90, to bring the assembly 34 to rest at the respective separating and depositing substations.

The lifting cylinder 84 is secured on the top plate 90 of the carriage 82, for movement with the carriage. The piston 85 is longitudinally and vertically reciprocatable in the lifting cylinder 84, and is connected to a piston rod 94 (FIG. 4) for movement therewith. An air conduit 95 and an exhaust flow controller 96 are connected to an air inlet and exhaust port at the base of the lifting cylinder 84. A muffler 97 and an exhaust flow controller 98 are connected to an air inlet and exhaust port at the top of the lifting cylinder 84.

The connecting rod assembly 86 includes a horizontal suspension bar 100, a pair of spaced parallel vertical connecting rods 102, a pair of connectors 104, and a lifting yoke 106 having downwardly projecting integral lugs 107. The suspension bar 100 is secured to a threaded upper end of the piston rod 94 by a nut 108 and to threaded upper ends of the connecting rods 102 by nuts 109. The connecting rods 102 are slidably movable through bushings 110 and 111 in holes of corresponding size in the top plate 90 and the bottom plate 91, respectively, of the carriage 82. The connectors 104 are secured to the lower ends of the connecting rods 102 and to the lifting yoke 106. The connecting rod assembly 86 thus is mounted on the piston rod 94 for vertical reciprocation therewith.

Figure 5:
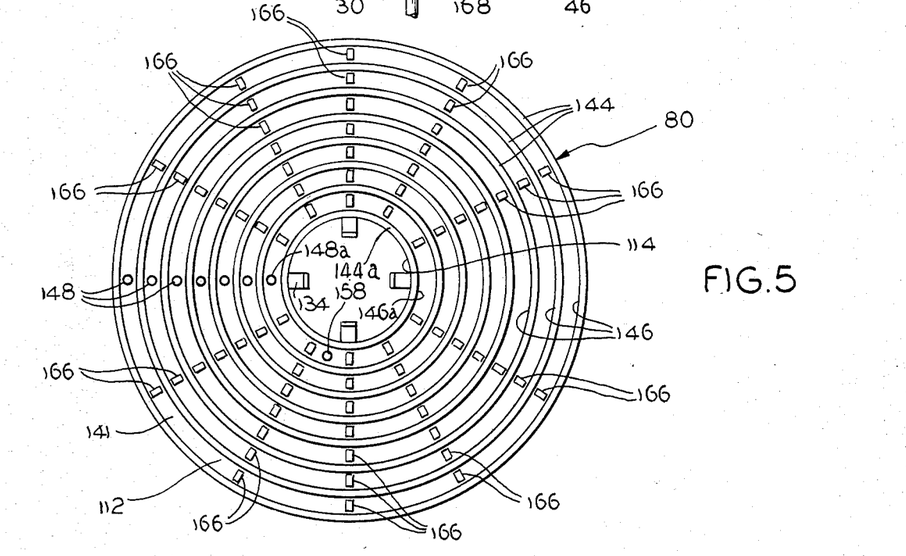
FIG. 5 is a further enlarged bottom plan view of a lifting head constituting part of the apparatus at such station, taken substantially on line 5—5 of FIG. 4.
Figure 6:
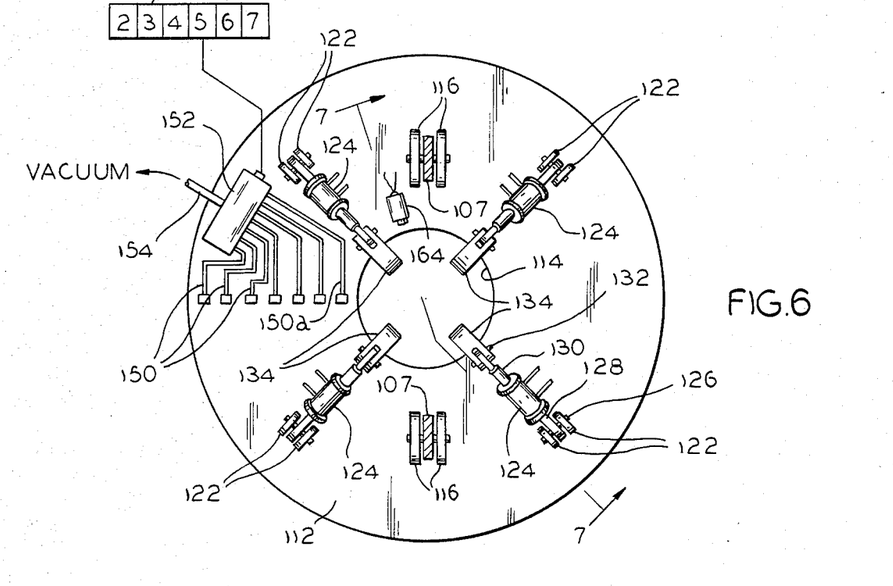
FIG. 6 is a similarly enlarged top plan view thereof, taken substantially on line 6—6 of FIG. 3.
Figure 7:
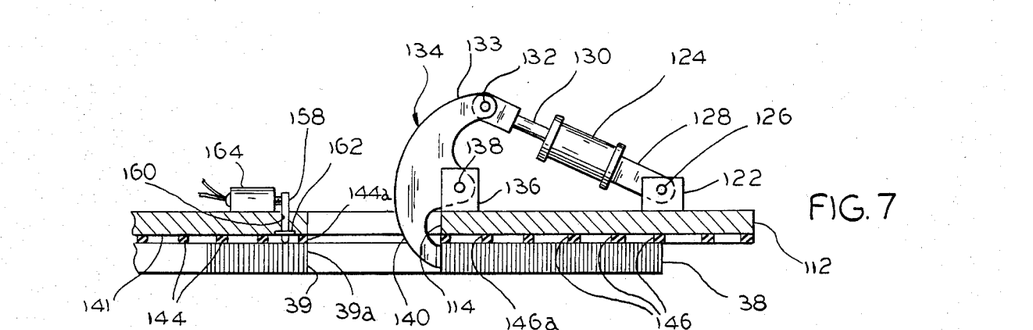
FIG. 7 is a still further enlarged fragmentary vertical sectional and elevational view of the lifting head, taken substantially on lines 7—7 of FIG. 6.
Figure 8:
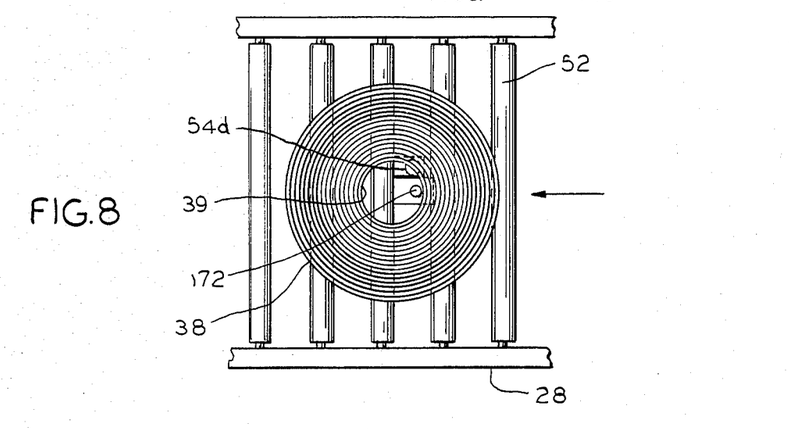
FIG. 8 is a top plan view of a portion of a separating conveyor section with a group of coils being oriented or centered thereon, taken substantially on line 8—8 of FIG. 3.

Referring particularly to FIGS. 5-7, the lifting head 80 includes a circular lifting plate 112 having a central circular opening 114 therethrough. Two pairs of lifting ears 116 are secured to the top of the lifting plate 112 in diametrically opposed relation, with the ears in each pair spaced apart and provided with openings 118 (FIG. 4) for the reception of connecting bolts or pins 120. The lifting yoke 106 is connected to the lifting plate 112 by inserting the lugs 107 of the yoke between the ears 116, and inserting the connecting bolts through the openings 118 in the ears and registering openings in the lugs. In this manner, the lifting head 80 is connected to and suspended from the connecting rod assembly 86 for movement therewith.

Four pairs of clamp-mounting ears 122 (FIGS. 6 and 7) are secured to the top of the lifting plate 112, equiangularly therearound. Pneumatic cylinders 124 are pivotally connected to the ears 122, by bolts or pins 126 inserted through openings in the ears and in lugs 128 on the cylinders. A piston rod 130 connected to a piston (not shown) in each cylinder 124 is pivotally connected by a pivot pin 132 to the outer end of one arm 133 of a coil clamp 134, which is in the form of a bell crank lever. The fulcrum of the clamp 134 is pivotally connected to an additional pair of ears 136 by a pivot pin 138. The free remaining arm 140 of the clamp 134 extends into the plate opening 114 and alternately above and below the undersurface 141 of the lifting plate 112. When the free arms 140 of the clamps 134 are disposed beneath the plate 112, equiangularly around the opening 114 therein, they hold in place the tail of a coil 38 adjacent to the plate 112, as shown in FIG. 7, and they also assist in holding the coil on the plate.

A series of spaced apart concentric circular rings 144 of increasing radii, numbering eight in the illustrative embodiment, is secured to the undersurface 141 of the lifting plate 112, in air-tight engagement therewith. The rings are formed of resilient flexible and compressible material, which preferably is foam rubber. The rings 144 commence with an inner ring 144a contiguous to the plate opening 114, and extend to the outer periphery of the plate 112. The rings 144 project downwardly from the undersurface 141, thereby to form a series of channels 146, seven in number, between adjacent rings. A series of air exhaust openings 148 (FIG. 5), one for each channel 146, is provided in the plate 112, extending therethrough and communicating with respective channels 146.

As illustrated in FIG. 6, air conduits 150 are connected to the top of the lifting plate 112, with each conduit leading to one of the exhaust openings 148. The conduits 150 are connected at their remote ends to a manifold 152, which is connected by a conduit 154 to a source of vacuum or reduced pressure. The manifold 152 contains conventional valving, not illustrated, operable for placing from one to seven of the conduits 150 in communication with the vacuum source, commencing with the radially innermost conduit 150a leading to the innermost exhaust opening 148a (FIG. 5). A control panel, indicated schematically at 156, is connected in the manifold 152. In the illustrative arrangement, the innermost conduit 150a is in communication with the vacuum conduit 154 at all times, and the valves controlling flow to the remaining conduits 150 are operated by pressing switch buttons corresponding to the number of conduits to be used, commencing with the innermost conduit 150a and progressing radially outwardly. The corresponding switch buttons are represented schematically in boxes in the representation of the control panel 156.

Referring to FIG. 7, a spring-pressed probe 158 in the form of a cylindrical rod is mounted for axial reciprocal movement in a hole 160 which extends through the plate 112 to the first channel 146a, and the mounting is rendered air-tight by a resilient sealing ring 162 mounted in the plate around the hole. The probe 158 extends into the first channel 146a from the undersurface 141, for a distance equal to or less than the distance which the rings 144 project from the undersurface. The probe 158 is connected to an electrical switch 164, which operates in response to in and out or up and down movement of the probe and is electrically connected to the operating controls for the lifting cylinder 84. Spacers or bottoming bars 166 (FIG. 5) are mounted on the undersurface 141 between the rings 144, being arranged in spaced apart radial rows thereround. The spacers 166 are arranged to leave openings or spaces between them and adjacent rings 144, to permit air flow in the channels 146 around the spacers. The spacers 166 project from the undersurface 141 to a lesser extent than do the rings 144 and the probe 158, and they serve to limit the vertical compression of the rings.

Referring to FIGS. 1, 3, 4, and 8, the stop assembly 30 includes a pneumatic cylinder 168 having a piston 170 therein and a piston rod providing or connected to a stop member 172 projecting upwardly therefrom. Air supply conduits 174 and 176 are connected to the cylinder 168 at the top and bottom thereof, to provide a double-acting piston and cylinder combination. The cylinder 168 is mounted beneath the separating section 28, on a vertically disposed channel member 178 in turn mounted on horizontal angle members 180, which are supported at their ends on the destacking station frame 48 and a stand at the station, having legs 46. The stop member 172 is disposed to register with the open space between two adjacent conveyor rollers 52, and is centered transversely between the opposite sides of the separating section 28. The stop member 172 is vertically reciprocatable between a withdrawn or retracted position beneath the upper surfaces of the rollers, illustrated in FIG. 4, and an extended position projecting above the rollers, illustrated in FIG. 3. In the extended position, the stop member 172 projects upwardly from the rollers 52 for a distance corresponding to the height of several or more coils in the coil groups 42 or the like to be destacked while supported on the separating section 28.

A fourth photocell 54d is mounted on the channel member 178 beneath and slightly to one side of the stop member cylinder 168, for casting its beam upwardly between adjacent rollers 52 and through the plate opening 114. A reflector 182 is mounted above the lifting head 80, on a bracket 184 secured to the rail 62. The reflector 182 is disposed in the path of the beam from the photocell 54d, for cooperation therewith.

The bander 37 provided in the illustrative packaging line is mounted on the processing station frame 50. The bander 37 is a conventional machine, which is operated semiautomatically to secure one or more metal straps, as desired, at a corresponding number of locations around each coil 38. The straps extend from the inner to the outer periphery of a coil, to hold the windings in place. From the processing station, the banded coil 38 may be conveyed on an additional conveyor section or sections, not illustrated, to an additional station or stations for performing another packaging operation or operations. In particular, each coil may be conveyed to a palletizing station, where successive pluralities of coils 38 are stacked on pallets for shipment.

In operation, the coil groups 42 are loaded on the conveyor line and conveyed to the destacking station in the manner described above. The first photocell 54a serves to detect coils on the accumulating section 26 and adjacent to the depositing section 24. When the photocell beam is interrupted by such coils, the downender 22 is prevented from operating pending removal of the coils from such location, to avoid interference between the coils and the downender. The first group 42a in a series of coil groups 42 is conveyed forwardly to the destacking station by actuation of the drives 51 for the successive loading, accumulating, and separating sections 24, 26, and 28. The drive for the separating section 28 is actuated when the group 42a breaks the beam of the second photocell 54b. When the first group 42a, and likewise each succeeding group 42, reaches the separating section 28 for destacking, the following groups 42 are accumulated on the accumulating section 26, which in the illustrative embodiment, will hold four or five groups in line, depending upon their diameter.

Figure 9:
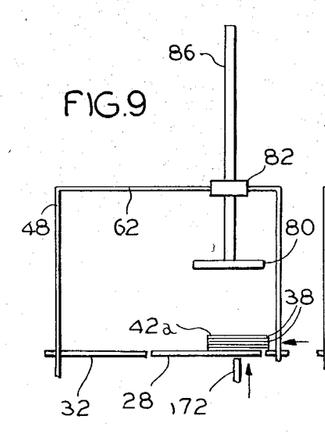
FIGS. 9 through 17 are schematic side elevational views of the apparatus at the destacking station, illustrating the operations at the station in sequence.
Figures 10, 15:
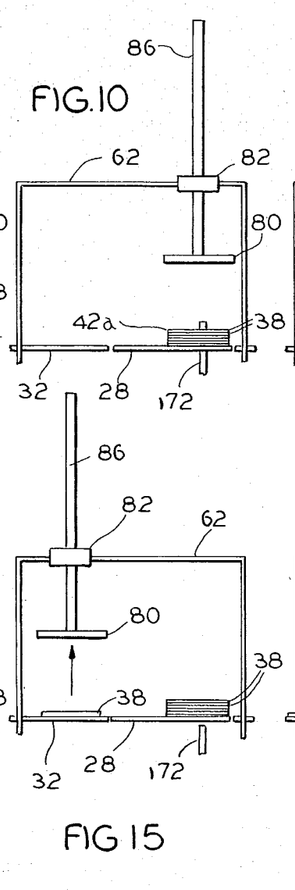

The fourth photocell 54d serves for sensing the coil openings 39 of a group of coils, such as the group 42a, on the separating section 28, when the openings register with the stop member 172. As the group 42a breaks the vertical beam from the fourth photocell 54d, followed by restoration of the beam as the coil openings 39 register therewith, suitable electrical relay and timer means, not shown, are actuated, as a result of which air under pressure is supplied to the lower conduit 176 on the stop member cylinder 168. The piston 170 is operated thereby, to extend the stop member 172 upwardly into the group 42a, through the coil openings 39. The drive 51 for the separating section 28 continues to operate, thereby turning the rollers 52 so as to tend to drive the group 42a forwardly, i.e., the rollers 52 are rotated in the counterclockwise direction as viewed in FIG. 3. Consequently, the group 42a is conveyed forwardly until the stop member 72 abuttingly engages the rear portions of the inner wall surfaces 39a of the coils. The foregoing operations are represented in FIGS. 9 and 10.

Figure 11:
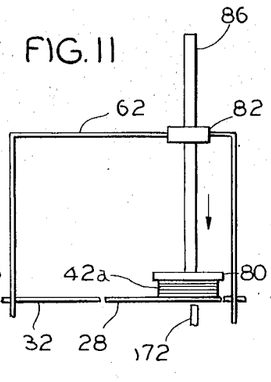

Operation of the separating section 28 continues until the end of a timed interval, e.g., until about 15 seconds have elapsed from the time that the beam from the photocell 54d registers with the openings 39 and the stop member 72 is projected into the openings. At the end of the timed interval, automatic deactuation of the drive 51 for the separating section 28 takes place, followed by withdrawal of the stop member 172 from the group 42a. Withdrawal of the stop member 172 is effected by supplying air under pressure to the upper conduit 174 on the stop member cylinder 168. During the operation of the separating section 28 while the stop member 172 engages the inner surfaces 39a of the coils 38 in the group 42a, the group may swing from side to side about the stop member 172, until it is oriented or centered on the separating section 28, as illustrated in FIG. 4. The group 42a is oriented with respect to the lifting head 80, which automatically is placed in operation at the end of the timed interval, by lowering it onto the group 42a, and thereafter operates automatically to effect destacking of the group. The foregoing operations are represented in FIG. 11.

Figure 3:
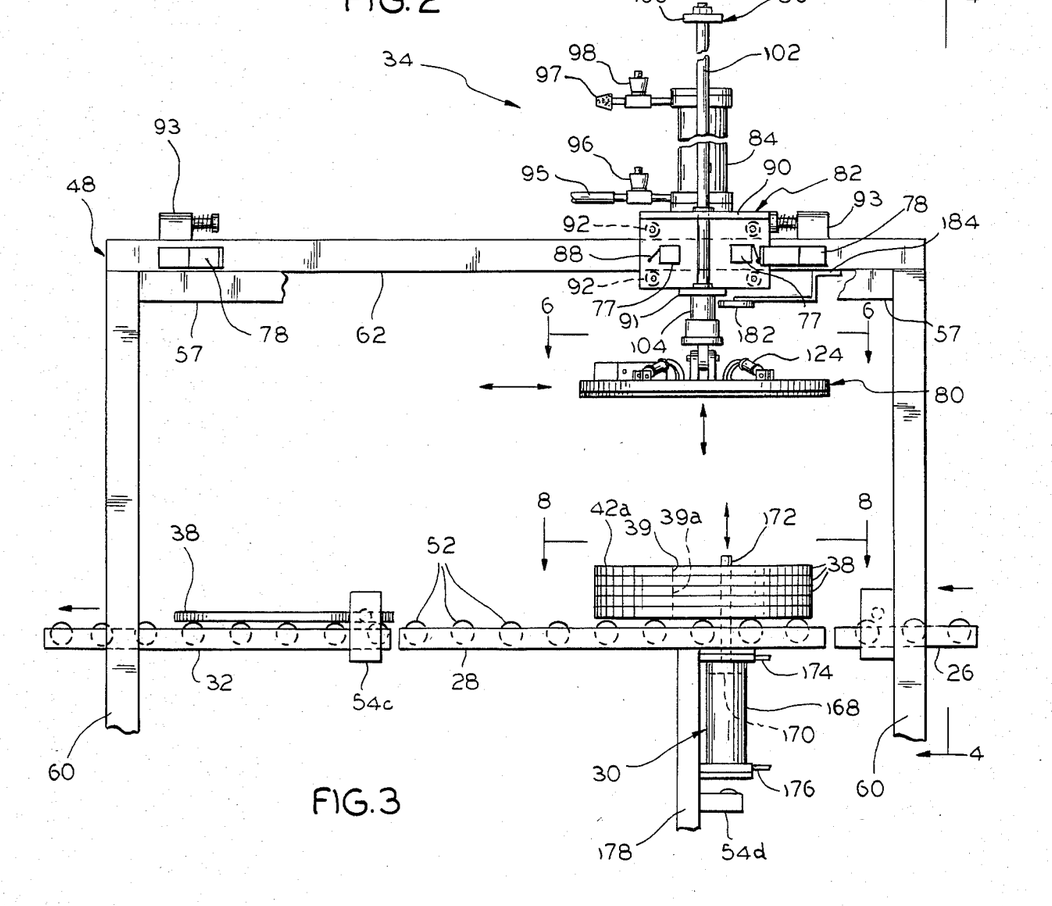
FIG. 3 is a similarly enlarged broken side elevational view of apparatus at such station, taken substantially on line 3—3 of FIG. 2.

In its operation, the lifting head 80 is elevated to the position illustrated in full lines in FIGS. 1, 3 and 4 by air under pressure supplied to the lifting cylinder 84 through the air conduit 95, while the upper flow controller 98 restricts the rate of air exhaust to slow upward movement. The lifting head 80 is lowered by gravity to the position illustrated in broken lines in FIG. 4, by venting air through the conduit 95, while the lower flow controller 96 restricts the exhaust and slows the downward movement. The lifting head 80 is lowered during destacking until it seats on the top coil 38 of the group 42a on the separating section 28. The lifting head 80 seats on the top coil 38, whether it be a coil on a high stack, or a single coil remaining on the separating section 28 following removal of the other coils originally stacked thereon in the group 42a or the like.

Referring to FIGS. 6 and 7, the clamp cylinders 124 are operated to extend the piston rods 130 and thereby pivot the clamps 134 about the pivot pins 138 when the lifting head 80 is seated on the group 42a during destacking, and vacuum is applied to the air conduits 150. The pivotal movement of the clamps 134 causes the free arms 140 to bear against the circular inner wall surface 39a of the adjacent coil 38 at the top of the group 42a, at four points around the periphery thereof, to hold the tail together with the remainder of the coil and also assist in suspending the coil from the lifting head 80. The application of vacuum to the conduits 150 serves to evacuate the channels 146, then closed by contact of the outer ends of the compressible resilient rings 144 with the upper surface of the tightly wound coil 38. The reduced pressure in the channels 146 draws the coil 38 towards the plate 112, compressing the rings 144, to hold the coil against the spacers 166 on the lifting head 80 by suction.

The control panel 156 is preset for evacuation of the number of channels 146 on the lifting head 54 that corresponds to the radial width of the coils 38: commencing with the first channel 146a, from one to seven of the channels 146 may be evacuated, depending upon the coil width, while the remaining channels are disconnected from the vacuum source, thereby to produce maximum vacuum or minimum pressure within the channels.

Figure 12:
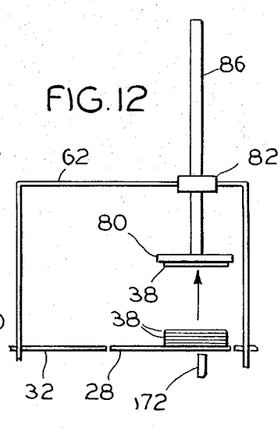

With the top coil 38 held against the lifting head 80 in the foregoing manner, the lifting head is elevated or raised to the position illustrated in FIG. 1, in the manner described above, and as represented in FIG. 12. Should the suction engagement of a coil 38 be inadequate for lifting purposes, however, the flow of compressed air to the conduit 95 at the base of the lifting cylinder 84 is discontinued, to forestall uncoiling or pulling apart of the coil. Poor suction may be caused by looseness in the winding of the coil or by misalignment of the coil. The probe 158 and the switch 164 provide control means for the operation of the lifting cylinder 84 and the connecting rod assembly 86 to raise the lifting head 80. The probe 158 senses a suction deficiency and operates the switch 164 to interrupt the lifting air supply. Thus, for the air line to the conduit 95 to remain open, it is necessary that the probe 158 be and remain raised by contact with the upper surface of the coil 38, which takes place under suction as the rings 144 are compressed by the coil. Should the suction be poor and the rings 144 thus not be compressed sufficiently by the coil 38, the probe 158 assumes a lowered position which operates to shut off the air supply to the conduit 95. The probe 158 reacts in this manner after the lifting head 80 is raised a short distance, when the coil 38 drops away from the spacers 166. The extent of raising is not substantial, such as to allow the coil to come apart. The problem must be corrected before the destacking operation will proceed.

Figure 13:
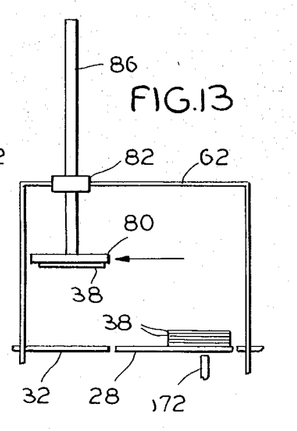

A vertical travel limit switch 186 (FIG. 4) on the lifting yoke 106 engages the bottom plate 91 of the carriage 82 when the lifting head 80 is raised to its full extent. Engagement of the vertical travel limit switch 186 causes air to be supplied to the conduit 74 (FIG. 2) at the front end of the traversing cylinder 63, whereby the piston 72 therein is moved rearwardly and the lifting head assembly 34 is moved forwardly. The lifting head assembly 34 travels forwardly until the front horizontal travel limit switch 77 engages the front bracket 78, and the top plate 90 engages the front shock absorber 93, at which time the assembly is at the depositing substation and above the depositing section 32, as represented in FIG. 13.

Figure 14:
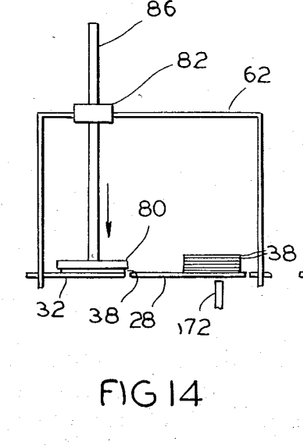

The resulting operation of the front limit switch 77 causes the lifting head 80 to be lowered by gravity, in the manner described above, until the coil 38 held thereby is seated on the depositing section 32, as represented in FIG. 14. The clamps 134 then are released from engagement with the coil 38, the lifting head 80 is raised a short distance, and the vacuum in the channels 146 is broken through the air conduits 150, whereupon the coil 38 drops a short distance onto the depositing section 32. By this technique, the force of gravity assists in breaking the vacuum.

Figure 16:
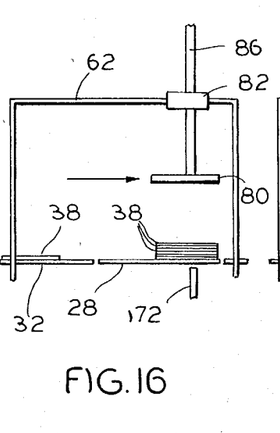

The lifting head 80 next is elevated in the manner described above, until the vertical travel limit switch 186 once more engages the bottom plate 91 of the carriage 82, as represented in FIG. 15. The operation of the limit switch 186 causes air to be supplied to the conduit 75 at the rear end of the traversing cylinder 63, thereby causing the piston 72 therein to move forwardly and the lifting head assembly 34 to move rearwardly, as represented in FIG. 16. The rear horizontal travel limit switch 77 engages the rear bracket 78, and the top plate 90 engages the rear shock absorber 93, at which time the assembly 34 is in its starting position at the separating substation and above the separating section 28.

Figure 17:
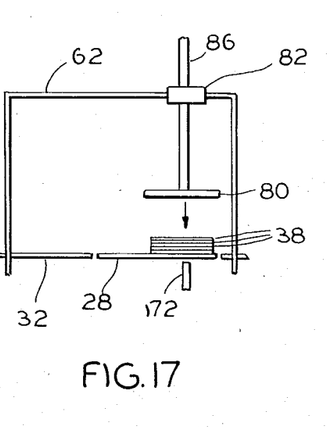

The drives 51 for the depositing section 32 and the processing section 36 are actuated by an operator at the processing station to convey the deposited coil 38 forwardly out of its deposited position before the next coil is deposited therein, as represented in FIG. 16. The coil 38 is conveyed to the processing section 36 and positioned thereon. Until the deposited coil 38 is removed from the path of the beam from the third photocell 54c, the start of the new cycle in the destacking operation is prevented. After removing the deposited coil 38 from the path of the photocell beam, the lifting head 80 is lowered automatically to commence a new cycle of operation with the next succeeding coil 38 in the group 42a, as represented in FIG. 17. The remainder of the cycle is repeated in the manner represented in FIGS. 11–16, and the full cycle is repeated for each successive coil 38, until the last coil in the group 42a has been deposited on the depositing section 32. The cycle is repeated automatically as successive deposited coils 38 are removed from the depositing section 32. As each group 42 is destacked, the next following group 42 is conveyed to the separating section 28, oriented thereon, and destacked, in the same manner.

When the supply of coil groups 42 exceeds the rate at which the packaging operations take place, for any reason, a plurality of groups 42 may be accumulated on the accumulating section 26, and an additional group 42 may be held on the loading section 24. Both of the loading and accumulating sections 24 and 26 may be operated independently, while the separating section 28 having a group 42a thereon is prevented from operating, so that the groups 42 may be accumulated during or while awaiting destacking of a group at the destacking station. Slitting and winding operations may be continued at a relatively even pace, as compared with the prior procedure, where the conveyor line was loaded with successive individual coils 38.

The several groups of coils may have varying numbers of coils, and the coils may vary, within limits, in thickness and in width. A feature of the apparatus is that it accommodates, alternatively, individual coils, such as relatively thick coils, which preferably are not loaded onto the conveyor line in stacks but are conveyed individually and directly to the processing station, as on a conventional line. Single coils may be interspersed between groups of stacked coils, according to production scheduling. The apparatus may be operated manually and in varying degrees of semiautomatic operation, to satisfy the packaging requirements as they exist from time to time.

A vacuum lifting head, such as the lifting head 80 is advantageous in that tightly wound coils of all types of metals may be handled. However, the invention is not limited to the use of a vacuum head, but other types of lifting heads may be employed, such as magnetic heads when the coils are made of ferromagnetic metals. As will be apparent to those skilled in the art, various other changes and modifications may be made in the method and apparatus of the illustrative preferred embodiments, within the spirit and scope of the invention. It is intended that all such changes and modifications be included within the scope of the appended claims.

I claim:

1. A method for supplying individually to a processing station annular metal coils which are provided in groups of adjacent side-by-side coils, which comprises the steps of:

providing a horizontal conveyor line including successive power-driven accumulating, separating, and depositing conveyor sections leading forwardly from a loading station towards a processing station, each of said conveyor sections being drivable independently of the others, placing said groups of coils in following order on said conveyor line at said loading station with the coils thereof stacked vertically, driving said accumulating and separating sections to convey said groups of coils forwardly to the separating section in turn, providing a lifting head operatable to engage the top coil of a group of coils on said separating section for the purpose of lifting the coil off of the remainder of the group, and to deposit the coil therefrom, inserting a stop member into each of said groups of coils on said separating section through the openings in the coils and into abutting engagement with the rear portions of the inner wall surfaces of the cells, while driving the separating section, thereby to orient the group beneath said lifting head for said engagement thereof with the top coil, destacking each of said groups of coils in turn while the group is stationary on said separating section by operating said lifting head to lift from the top of the group, carry forwardly, and deposit on said depositing section individual coils of the group successively, driving said depositing section to convey each deposited coil forwardly out of its deposited position before depositing the next coil therein, and driving said accumulating section while a group of coils is stationary on said separating section for destacking thereof, to accumulate following groups of coils on the accumulating section.

2. Apparatus for supplying individually to a processing station annular metal coils which are provided in groups of adjacent side-by-side coils, which comprises:

a horizontal conveyor line including successive accumulating, separating, and depositing conveyor sections leading forwardly from a loading station towards a processing station, said conveyor line being adapted for conveying said coils thereon, in said groups with the coils thereof stacked vertically from the loading station to the separating section, and individually from the depositing section to the processing station, power drive means actuatable for driving each of said conveyor sections independently of the others, a lifting head operatable to engage the top coil of a group of coils on said separating section for the purpose of lifting the coil off of the remainder of the group, and to deposit the coil therefrom, means for operating said lifting head, a stop member insertable into a group of coils on said separating section through the openings in the coils and into abutting engagement with the rear portions of the inner wall surfaces of the coils while the separating section is driven, thereby to orient the group beneath said lifting head for engagement thereof with the top coil, means for moving said stop member into and out of a group of coils on the separating section, means for moving said lifting head up and down over said conveyor line, and means for moving said lifting head back and forth between said separating section and said depositing section, whereby the drive means for said accumulating and separating sections may be actuated to convey to the separating section in turn said groups of coils arranged in following order on the conveyor line with their coils stacked vertically, said lifting head may be operated and moved to engage on top of each group of coils while stationary on said separating section, lift from the top of the group, carry forwardly, and deposit on said depositing section individual coils of the group successively, thereby to effect destacking of the group, the drive means for the depositing section may be actuated to convey each deposited cell forwardly out of its deposited position before the next coil is deposited therein, and the drive means for said accumulating section may be actuated while a group of coils is stationary on said separating section for destacking thereof, to accumulate following groups of coils on the accumulating section.

3. Apparatus as defined in claim 2 and wherein said stop member is mounted beneath said separating section for movement therethrough and into said group of coils thereon.

4. Apparatus as defined in claim 2 and wherein said lifting head is adapted for applying suction to said top coil for lifting purposes.

5. Apparatus as defined in claim 4 and wherein said stop member is mounted beneath said separating section for movement therethrough and into said group of coils thereon.

6. Apparatus for destacking a stack of annular metal coils, which comprises:

a horizontal conveyor section adapted for supporting thereon a vertical stack of coils in adjacent side-by-side relation to each other, means for driving said conveyor section, a lifting head operatable to engage the top coil of a stack of coils on said conveyor section for the purpose of lifting the coil off of the remainder of the stack, and to deposit the coil therefrom, means for operating said lifting head, a stop member insertable into a stack of coils on said conveyor section through the openings in the coils and into abutting engagement with the rear portions of the inner wall surfaces of the coils while said conveyor section is driven, thereby to orient the stack beneath said lifting head for said engagement thereof with the top coil, and means for moving said stop member into and out of a stack on the conveyor section.

7. Apparatus as defined in claim 6 and wherein said stop member is mounted beneath said conveyor section for movement therethrough and into said stack on the conveyor section.

8. Apparatus as defined in claim 7 and wherein said lifting head is adapted for applying suction to said top coil for lifting purposes.

9. Apparatus as defined in claim 7 and including means for sensing the openings of a stack of coils on the conveyor section when the openings register with said stop member.

10. Apparatus for destacking a stack of metal coils, which comprises:

a horizontal conveyor line including successive separating and depositing conveyor sections, said separating section being adapted for supporting thereon a vertical stack of coils in adjacent side-by-side relation to each other and said depositing section being adapted for supporting a coil from said stack deposited thereon, power drive means actuatable for driving each of said conveyor sections independently of the other, a lifting head operatable to engage the top coil of said stack on the separating section by the application of suction to the coil for the purpose of lifting the coil off of the remainder of the stack, and to deposit the coil therefrom when the application of suction is discontinued, means for operating said lifting head, means for moving said lifting head up and down over said conveyor line, control means for preventing said moving means from moving said lifting head in engagement with a coil upwardly to a substantial extent in the event of an insufficient application of suction to the coil for lifting purposes, said control means including a member movable to effect discontinuance of upward movement of the lifting head in response to relative movement of the coil away from the lifting head, and means for moving said lifting head back and forth between said separating section and said depositing section, whereby a stack of coils may be conveyed to said separating section, said lifting head may be operated and moved to engage on top of the stack while stationary on the separating section, lift from the top of the stack, carry along the conveyor line, and deposit on said depositing section individual coils of the stack successively, thereby to effect destacking of the stack, the destacking being interrupted in the event of an insufficient application of suction to lift a coil, and the drive means for the depositing section may be actuated to convey each deposited coil out of its deposited position before the next coil is deposited therein.

11. Apparatus for destacking a stack of annular metal coils, which comprises:

a horizontal conveyor line including successive separating and depositing conveyor sections, said separating section being adapted for supporting thereon a vertical stack of coils in adjacent side-by-side relation to each other and said depositing section being adapted for supporting a coil from said stack deposited thereon, power drive means actuatable for driving each of said conveyor sections independently of the other, a lifting head operatable to engage the top coil of said stack on the separating section by the application of suction to the coil for the purpose of lifting the coil off of the remainder of the stack, and to deposit the coil therefrom when the application of suction is discontinued, means for operating said lifting head, a stop member insertable into a stack of coils on said separating section through the openings in the coils and into abutting engagement with the rear portions of the inner wall surfaces of the coils while the separating section is driven, thereby to orient the stack beneath said lifting head for said engagement thereof with the top coil, means for moving said stop member into and out of a stack on the separating section, means for moving said lifting head up and down over said conveyor line, control means for preventing said lifting head moving means from moving said lifting head in engagement with a coil upwardly to a sustantial extent in the event of an insufficient application of suction to the coil for lifting purposes, said control means including a member movable to effect discontinuance of upward movement of the lifting head in response to relative movement of the coil away from the lifting head, and means for moving said lifting head back and forth between said separating section and said depositing section, whereby a stack of coils may be conveyed to said separating section, said lifting head may be operated and moved to engage on top of the stack while stationary on the separating section, lift from the top of the stack, carry along the conveyor line, and deposit on said depositing section individual coils of the stack successively, thereby to effect destacking of the stack, the destacking being interrupted in the event of an insufficient application of suction to lift a coil, and the drive means for the depositing section may be actuated to convey each deposited coil out of its deposited position before the next coil is deposited therein.

* * * * *